F. A. COFFMAN.
WATERING-TROUGH.
No. 183,837. Patented Oct. 31, 1876.
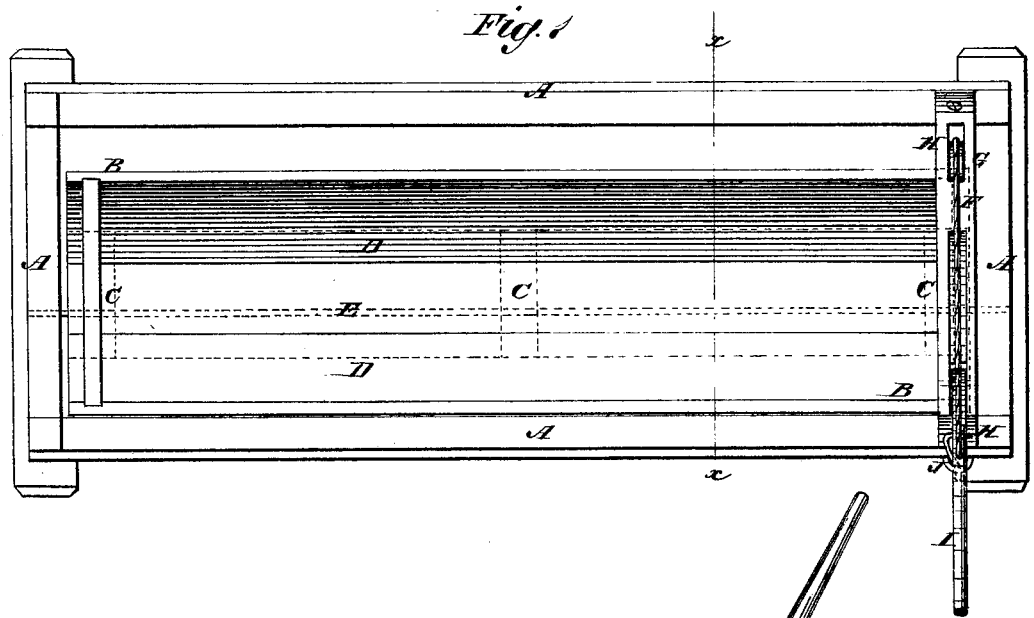
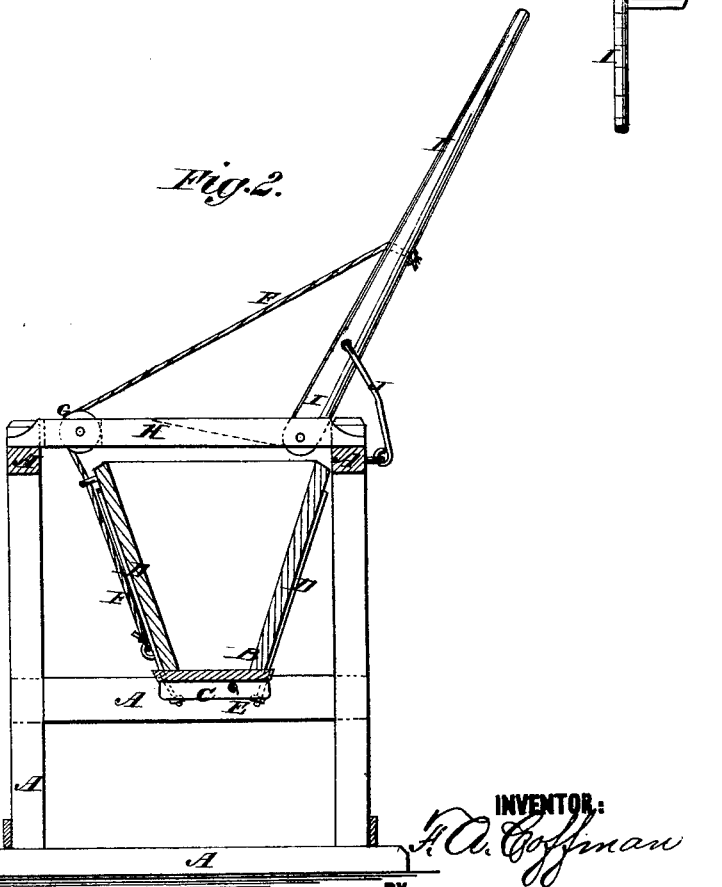

UNITED STATES PATENT OFFICE.

FRANK A. COFFMAN, OF TIPTON, IOWA.

IMPROVEMENT IN WATERING-TROUGHS.

Specification forming part of Letters Patent No. 183,837, dated October 31, 1876; application filed May 22, 1876.

*To all whom it may concern:*

Be it known that I, FRANK A. COFFMAN, of Tipton, in the county of Cedar and State of Iowa, have invented a new and Improved Watering-Trough, of which the following is a specification:

Figure 1 is a top view of my improved watering-trough. Fig. 2 is a vertical cross-section of the same, taken through the line $x\ x$, Fig. 1.

The object of this invention is to furnish an improved trough for watering stock, which shall be so constructed that the water can be readily poured out of it in winter to prevent it from becoming filled with ice, and which shall be simple in construction, inexpensive in manufacture, and convenient in use.

The invention consists in the combination of the rod with the trough and its frame, to enable the said trough to be turned to discharge its contents; in the combination of the rope or chain, the pulley, and the lever with the tilting trough and the frame; and in the combination of the hook with the lever, the rope or chain, the tilting trough, and the frame, as hereinafter fully described.

A is a frame of such a length and breadth as to receive a trough, B, within it. The trough B is constructed in the usual way, and of such a size as the amount of stock to be watered may require. To the bottom of the trough B are attached cleats C, which are further secured in place by iron straps D, attached to their ends and to the sides of the said trough. The straps D also strengthen the trough B. Through the holes in the cleats C passes a rod, E, which extends the whole length of the trough B, and its ends enter bearings formed in or attached to end bars of the frame A.

The rod E may be placed a little to one side of the central line of the trough B, so that the said trough will tip over if left unsupported, and discharge its contents. To the lower part of the heavier side of the trough B, near one end, is attached one end of a rope or chain, F, which passes around a pulley, G, pivoted in a slot in the end of a cross-bar, H, attached to the frame A. The other end of the rope or chain E is attached to a lever, I, the lower end of which is pivoted to the other end of the cross-bar H, or to the frame A.

By this construction the trough may be tilted or tipped over to discharge its contents, and again raised into position when required by operating the lever I. The lever I is secured in place, when supporting the trough in an erect position, by the hook J, pivoted to the frame A, and which hooks into a hole formed in said lever, or into an eye or staple attached to it.

Having thus described my invention, what I claim as new, and desire to secure by Letters Patent, is—

1. The combination of the rod E with the trough B and frame A, to enable the said trough to be turned down to discharge its contents, substantially as herein shown and described.

2. The combination of the rope or chain F, the pulley G, and the lever I with the tilting trough B and the frame A, substantially as herein shown and described.

3. The combination of the hook J with the lever I, rope or chain F, tilting trough B, and frame A, substantially as herein shown and described.

FRANK A. COFFMAN.

Witnesses:
JOHN B. STUBBLEFIELD,
JOHN J. JOHNSON.